United States Patent [19]

Reick et al.

[11] Patent Number: 4,634,943
[45] Date of Patent: Jan. 6, 1987

[54] CONTROL DEVICE FOR A DIRECT CURRENT SEMICONDUCTOR REGULATOR

[75] Inventors: Horst Reick, Effeltrich; Gerhard Kratz, Heroldsbach, both of Fed. Rep. of Germany

[73] Assignee: Siemens Aktiengesellschaft, Munich and Berlin, Fed. Rep. of Germany

[21] Appl. No.: 775,473

[22] Filed: Sep. 12, 1985

[30] Foreign Application Priority Data

Sep. 14, 1984 [DE] Fed. Rep. of Germany ....... 3433886

[51] Int. Cl.[4] .............................................. H02P 7/00
[52] U.S. Cl. .................................... 318/432; 318/439; 318/618; 323/272; 323/283; 363/65; 363/124
[58] Field of Search ............... 318/432, 439, 254, 138, 318/618; 323/272, 283, 268, 271, 269; 363/65, 67, 69, 70, 71, 124

[56] References Cited

FOREIGN PATENT DOCUMENTS 2655077 6/1978 Fed. Rep. of Germany ...... 318/432

*Primary Examiner*—Vit W. Miska
*Assistant Examiner*—Patrick C. Keane
*Attorney, Agent, or Firm*—F. W. Powers; J. L. James

[57] ABSTRACT

An inductive load 1, more specifically a direct current motor, is fed by a direct current source through a semiconductor regulator which contains two parallel switching controllable semiconductor rectifier elements with identical conduction direction which in turn are in series with a respective one-half of center tapped output autotransformer. Parallel to the semiconductor regulator is an additional and identical semiconductor regulator. The center tap points of both semiconductor regulator autotransformers are connected with the terminals of a third output autotransformer which is similarly center tapped, whereby the center tap point of the third output autotransformer is connected to a terminal (+) of the inductive load. The control assembly is made in such a manner that it produces clock frequency signals with identical control levels for both semiconductor rectifier elements; however, these signals for the two parallel switching arrangements are, electrically offset by 90 degrees. In this way, it is possible to operate the motor in RPM ranges where a minimum of ripple current is obtainable.

11 Claims, 6 Drawing Figures

CONTROL DEVICE FOR A DIRECT CURRENT SEMICONDUCTOR REGULATOR

BACKGROUND OF THE INVENTION

This invention relates to electronic voltage and current regulators and more particularly to a control device for a circuit arrangement whereby an inductive load is fed by a direct current source through a semiconductor regulator which contains two parallel, switching, controllable semiconductor rectifier elements with identical current conductions and within the control circuit is an arrangement for the generation of clock frequency signals.

In addition to semiconductor rectifier elements and the clock frequency signals, there is an inductive impedance in the circuit, connected to and on the output side of each semiconductor rectifier element. The input side connection point of each semiconductor rectifier element is connected to a terminal of the direct current source. Moreover, the center tap connection point of the inductive impedance is connected to a terminal of the load. The output connection point of the semiconductor rectifier element is connected to the input of the inductive impedance and to a discharge diode, the other end of this diode being connected to the other terminal of the load. The inputs of the semiconductor rectifier elements are connected to the control circuit, which generates two clock frequency signals electrically offset from each other by 180 degrees. These signals are each fed by means of a control circuit to the semiconductor rectifier elements in such a way that they are alternately non-conducting and conducting in an 180 degree offset pattern.

A control circuit of this type is described in U.S. Pat. No. 4,417,197. Transistors or thyristors make up the semiconductor rectifier elements. The inductive impedance, which is switched in series with the controllable semiconductor rectifier element constitutes a low-pass filter, together with a filter capacitor which in turn is in parallel with the load impedance. The non-interconnected inductive impedances provide a delayed current rise and fall in order to reduce the ripple current originated by the timing as much as possible. At the capacitor and therefore at the load impedance, there is a relative higher voltage than at the input side of the semiconductor rectifier element. Thereby the voltage at the capacitor and at the load impedance has ripple current with a frequency twice as high as the timing pulse frequency. The switching noises of the semiconductor elements have been reduced because the semiconductor rectifier elements of the frequency converter only need to be driven at half the timing clock frequency as compared to other chopper switches. The circuitry described in U.S. Pat. No. 4,417,197 is, however, not suited for the feeding of individual inductive loads, such as motors. With such loads, there is a strong possibility of an actual noise increase at the load.

A direct current converter is described in the British publication GB-A-No. 1 007 169. In the case of this converter, a load is fed by a direct current source through a semiconductor controller containing two parallel switching controllable semiconductor rectifier elements of identical conductance direction. It has an arrangement used to generate clock frequency signals in such a way that the semiconductor rectifier elements are non-conducting and conducting alternately and offset by 180 degrees. The semiconductor rectifier elements are switched on the output side of an autotransformer with a center tap point whereby the input connection point of the semiconductor rectifier elements is connected to a terminal of the direct current source and where the center tap point is connected to a terminal of a load impedance. The connection points of the semiconductor rectifier elements with the autotransformer are connected through a diode to the other terminal of the load. In this arrangement, the load is embodied by an resistive load, as this is the case in, for example, electronic switching systems, remote control systems or computers. The semiconductor rectifier elements are made of transistors whose control voltages are taken from windings coupled to the autotransformer. In this case both transistors are non-conducting and conducting alternately and offset by 180 degrees so that one obtains at the load a direct current composed of half wave voltage pulses or blocks sequentially added in time. The resulting direct current voltage occurring at the load has half the value of the battery voltage put on the autotransformer, and it is not without discontinuities. The autotransformer of the known direct current converter also acts as a symmetrical voltage divider for the battery current. A control of the voltage, or of the current put onto the load has not been arranged. With this known direct current converter it is not possible, however, to control the power output of an inductive or resistive load.

Parallel switches made of transistors are known from British publication GB-A-No. 1 371 418. In their case one will encounter measures for the obtaining of an identical active current in each transistor by means of coupling transformers. A drive system controlled by a micro processor where a direct current motor is controlled from a battery through a transistor, is known from the article in the publication IEEE Transactions on Industry, volume 1A-17, number 6, November / December 1981, pages 626 through 631. This article shows a direct current motor switched in parallel with a discharge diode. In order to drive the direct current motor as a power generating brake, an additional transistor with an additional discharge diode has been included.

It is an object of this invention to provide a controlled circuit in which the ripple current supplied to the load of a variable-power, small inductive load is further reduced. Another object of the invention is to effectively reduce the noise which occurs at the load because of the current pulsing.

SUMMARY OF THE INVENTION

Briefly stated in accordance with one aspect of the invention, the aforementioned objects are achieved by providing a control device for a switching arrangement with a direct current source feeding a load through a semiconductor rectifier regulator unit having two controllable semiconductor rectifier elements of identical conductance direction as part of the regulator unit, and a device for generating clock signals as part of the control device connected to the controllable semiconductor rectifier elements. An inductive impedance is connected to an output of each semiconductor rectifier element and provides an output terminal connection to the load. An input connection to each semiconductor rectifier element is connected with a positive terminal of the direct current source, wherein each output connection of the semiconductor rectifier elements is connected by the inductive impedance to the load and each is also connected by a discharge diode to the negative terminal of the direct current power supply. The control device provides two clock frequency signals electrically offset by 180 degrees to the two controllable semiconductor rectifier elements through regulators such that said semiconductor elements are conducting and non-conducting 180 degrees offset from each other. This control device is characterized by a direct current motor as the load, a dual winding, buck-boost, autotransformer, with a center tap between the dual windings, as the inductive impedances, a reference value generator providing control of a duty cycle of the clock frequency signals connected within the control device, an additional semiconductor rectifier regulator unit and an additional buck-boost autotransformer in parallel with and identical to the first semiconductor rectifier regulator unit, with the center tap point of the first buck-boost autotransformer and a center tap point of the additional buck-boost autotransformer connected to opposite inputs of a third buck-boost autotransformer and a center tap point of the third buck-boost autotransformer connected to a power input terminal of the load. The identical duty cycle clock frequency signals generated for the two parallel semiconductor rectifier regulators are electrically offset 90 degrees from each other.

Because of this, the timing frequency at the inductive load is multiplied by four and the ripple current ratio is reduced to approximately one sixteenth, so that the part of the noise degradation of the pulse frequency as well as the weight and the volume because of small filter elements of the complete system can be kept at a much lower level as compared to the known systems. In addition, if the inductive load is a direct current motor, it is possible to run the drive at several RPM levels at constant duty cycles of the semiconductor rectifier element in the area of 0.25, 0.5, 0.75 or 1, and with a constant direct current at the armature. When a direct current motor is used as inductive load, it has shown to be advantageous when the duty cycle of the exciter current controller is changed by the RPM control unit when operating in the ranges between the previously described control steps. This way, it is possible to be controlled throughout the RPM range while keeping the ripple current at a zero level.

Through corresponding additional parallel semiconductor rectifier elements and buck-boost autotransformers with center tap point arrangements it is possible to reduce the ripple current ratio and thus also reduce the ripple current even at a low duty cycle.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF A PREFERRED EMBODIMENT

Figure 1:
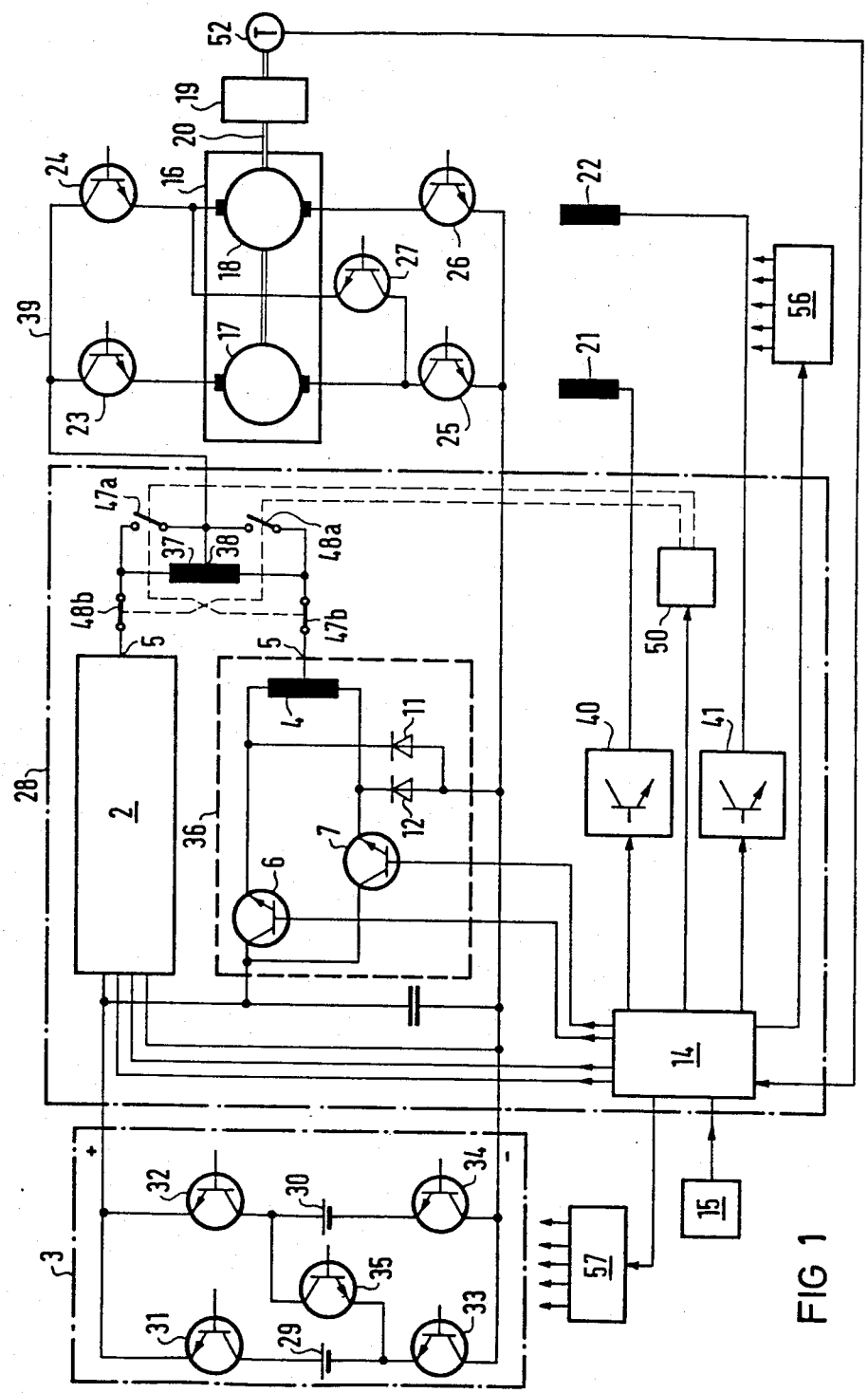
FIG. 1 shows an arrangement for the operation of an electrical vehicle.

FIG. 1 shows a system for the regulation of an inductive load, which, in this case, is the RPM control of the direct current drive of an electrical vehicle, whereby the two armatures 17, 18 are mounted on shaft 20 which works on drive wheel 19. The exciter windings of the direct current motor are indicated by 21 and 22. The armatures 17 and 18 are supplied through the semiconductor switches 23 through 27 and through an exciter and armature current controller 28 by the batteries 29 and 30 divided in groups, and to which semiconductor switches 31 through 35 have been added.

For the RPM control, the batteries 29, 30 and/or the armatures 17, 18 are commutated from series to parallel, and vice versa, by means of a RPM-reference value generator 15, and by the control unit 14 which controls switches 23 through 27 and respectively by switching arrangement 57 which control the switches 31 to 35.

Figure 2:
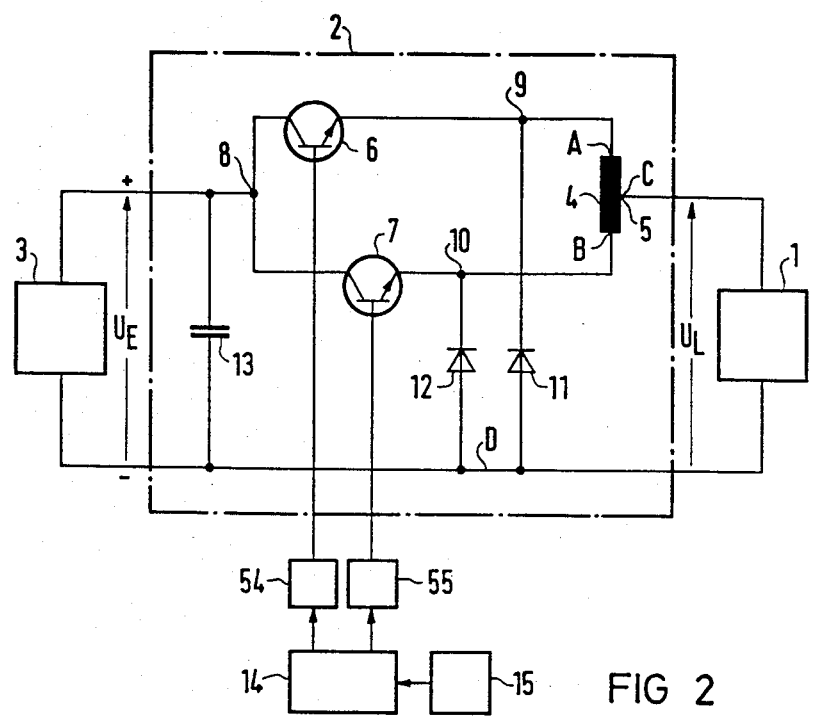
FIG. 2 shows a simplified circuit illustrating the operation of the semiconductor controller shown in FIG. 1, while feeding an inductive load and connected to a direct current source.

The armature and exciter current controller 28 for drive 16 contains a semiconductor controller 2, which, as FIG. 2 shows, is made of at least 2 controllable semiconductor rectifier elements 6, 7 (transistors) which are switched with a center tap point 5 on a buck-boost autotransformer 4. The direct current motor 1 is connected with a semiconductor controller 2 to a direct current source 3, which in turn is parallel to a storage capacitor. The positive terminal of the direct current source 3 is connected to the power input terminals of the identical conductance direction semiconductor rectifier element 6 and 7 at point 8. During operation, the direct current from the source is supplied alternately through the output terminals of elements 6 and 7 into dual wound buck-boost autotransformer 4 and out a center tap 5 to the inductive load 1. A discharge diode 11 is connected at point 9 to semiconductor rectifier element 6 and to buck-boost autotransformer winding A input to allow current discharge during switching as will be explained later.

The two semiconductor rectifier elements 6 and 7 are non-conducting and conducting offset by 180 degrees in the timing frequency. This is controlled by control unit 14, which is controlled by a reference value generator 15. Control unit 14 produces two clock frequency signals which are electrically offset by 180 degrees and these clock frequency signals control the semiconductor rectifier elements 6 and 7 over regulating units 54 and 55.

Figure 3:
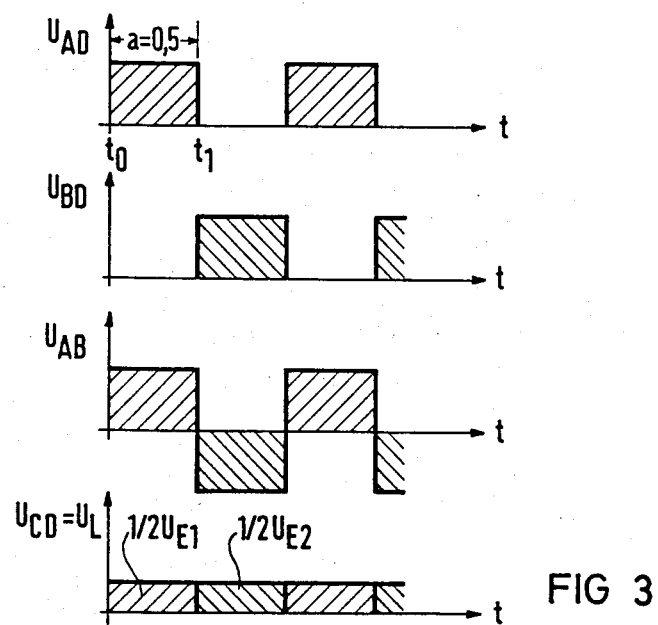
FIG. 3 shows a voltage versus time plot at various points of the circuit of FIG. 2.

It is admitted that in the case of the switching system shown in FIG. 2 both semiconductor rectifier elements 6 and 7 operate at a control duty cycle of 0.5 "a", where "a" is the reference clock period. This results, as shown in FIG. 3, in specific voltages at points A through D. The semiconductor rectifier element 6 is non-conducting, at moment $t_0$, by a clock frequency signal with a duty cycle ratio of 0.5. This creates an input voltage at point A over the specified period of time. During this activated period, during which the semiconductor rectifier element 7 is conducting, a current is maintained in the inductive load by means of a discharge diode 12 and part B–C of the buck-boost autotransformer 4. This results in a shifting of the potential of point D to point B and the buck-boost autotransformer 4 acts as symmetrical voltage divider for the voltage occurring at point A, so that one obtains, at point C, half the voltage ½ $U_{E1}$ of the voltage at the direct current source 3.

Thereby, at moment $t_1$, the clock frequency signal given by control unit 14 is ended, the semiconductor rectifier element 6 is conducting and the semiconductor rectifier element 7 is non-conducting according to a clock frequency signal which comes from control unit 14 over regulating unit 55. The current is maintained in the inductive load over discharge diode 11 and over parts A and C of the buck-boost autotransformer 4. During the the period of time when semiconductor rectifier element 7 is non-conducting, an input current occurs at point B of the buck-boost autotransformer 4. Since the potential of point D is shifted over the forward biased, discharge diode 11 to point A, the buck-boost autotransformer acts as a symmetrical voltage divider for the input voltage occurring at point B so that one obtains half the voltage ½ $U_{E2}$ at point C of the voltage at the direct current source. Since the semiconductor rectifier elements 6 and 7 are non-conducting and conducting offset by 180 degrees at a regulation level of 0.5 and by a sequential adding over the operation time of voltage blocks ½ $U_{E1}$+½ $U_{E2}$, a gapless direct current at the load is obtained.

In FIG. 1, an additional semiconductor rectifier element 36 is switched parallel to semiconductor rectifier element 2. This semiconductor rectifier element 37 is identical to the semiconductor rectifier element 2. The center tap point of the buck-boost autotransformer 4 of both semiconductor regulators 2 and 36 is connected to the terminals of a buck-boost autotransformer 37 with center tap point 38 and whereby the center tap point 38 of the third buck-boost autotransformer 37 is connected to the + terminal of the bus bar 39. Both semiconductor regulators 2 and 36 are controlled by means of clock frequency signals generated by control unit 14. These clock frequency signals have identical duty cycles but are controlled as to be electrically offset by 90 degrees so that the output voltages fed into the third buck-boost autotransformer are offset by 180 degrees. The exciter windings 21 and 22 are controllable by control unit 14 by means of a known exciter current semiconductor regulators each (40 and 41). The semiconductor rectifier elements 6 and 7 are driven in steps at the constant duty cycles of 0.25, 0.5, 0.75 or 1, as to obtain a gapless direct current at the armatures. One obtains, as this is shown in FIG. 3. of FIG. 2, a gapless direct current voltage at a value of 25, 50, 75, or 100% of the original battery voltage. In order to regulate the RPM levels when operating between two of the previously described steps, it is possible to change the duty cycles of the exciter current regulators 40 and 41. It has been shown to be advantageous to equip the control unit 14 with a computer which receives the voltage indicating the actual value from a tachometer 52. For each corresponding actual value, the computer decides which duty cycle 0.25, 0.5, 0.75 or 1, should be used as to obtain a minimum level of ripple current and then regulates the exciter current regulators 40 and 41 as to obtain the specified RPM level.

Figure 4:
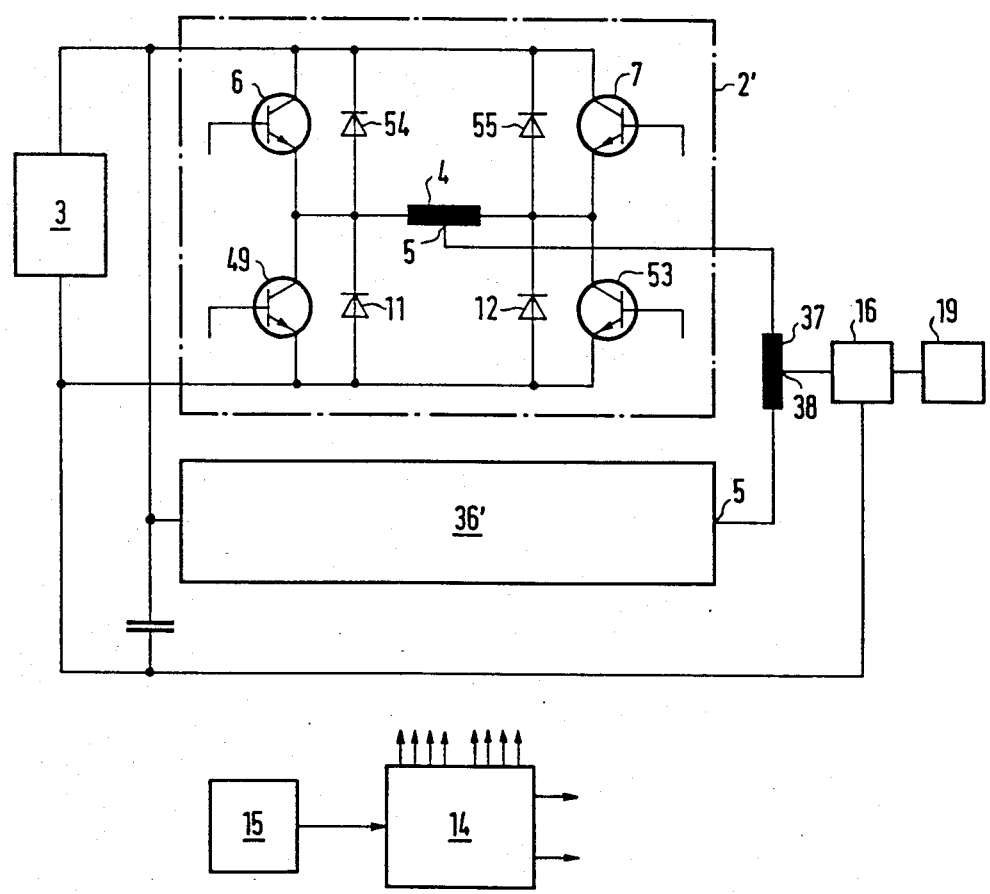
FIG. 4 shows a switch for a brake in an electrical vehicle embodying the invention.
Figure 5:
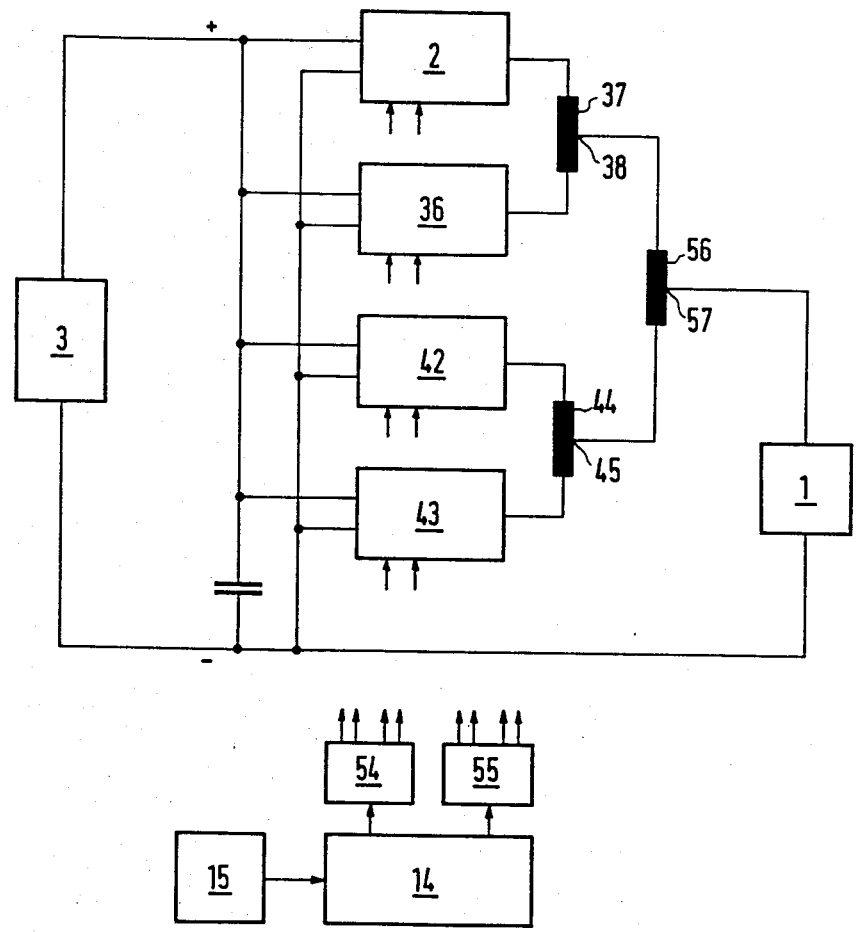
FIG. 5 shows an additional circuit arrangement for the operation of an inductive load.

In order to allow braking, the buck-boost autotransformer 4 is combined with a suitable bridge circuit of a known type made of semiconductor rectifier elements 6, 7, 49, 53 and whereby each semiconductor rectifier element is parallel switched, as can be seen in FIG. 4, with a discharge diode, respectively 11, 12, 54, and 55. A suitable switching device 50 has been provided as shown in FIG. 1. This switching device switches, when one regulator is switched-off or fails, for example regulator 36, the drive 16 to the remaining regulator 2, whereby switch 47a is conducting and whereby regulator 36 is switched off through the opening of switch 47b. After the regulator 36 has been switched-off, the drive can be operated solely with regulator 2. This case is represented in FIG. 2. The clock frequency at the inductive load 1 is multiplied by two and the ripple current ratio is increased by one-fourth when compared to the switching arrangement shown in FIG. 1. If the control device generates clock frequency signals of 0.5 or 1 duty cycles, one obtains, at the direct current motor, a direct current without any ripple current. Noise production by the pulse frequency can therefore not occur anymore. FIG. 5 shows a further embodiment having an additional parallel arrangement of regulators and buck-boost autotransformers for a further reduction of the ripple current ratio and for an increase in the number of minima of the ripple current. Parallel to the two semiconductor regulators 2 and 36 with buck-boost autotransformers 4 and 37, one will find an additional parallel switch made of two semiconductor regulators 42 and 43 and of buck-boost autotransformers 37 and 44, and the center tap points 38 and 45 of the buck-boost autotransformers 37 and 44 are switched with an additional buck-boost autotransformer 56. This buck-boost autotransformer has a center tap point 57 which is connected to the + terminal of the inductive load.

Figure 6:
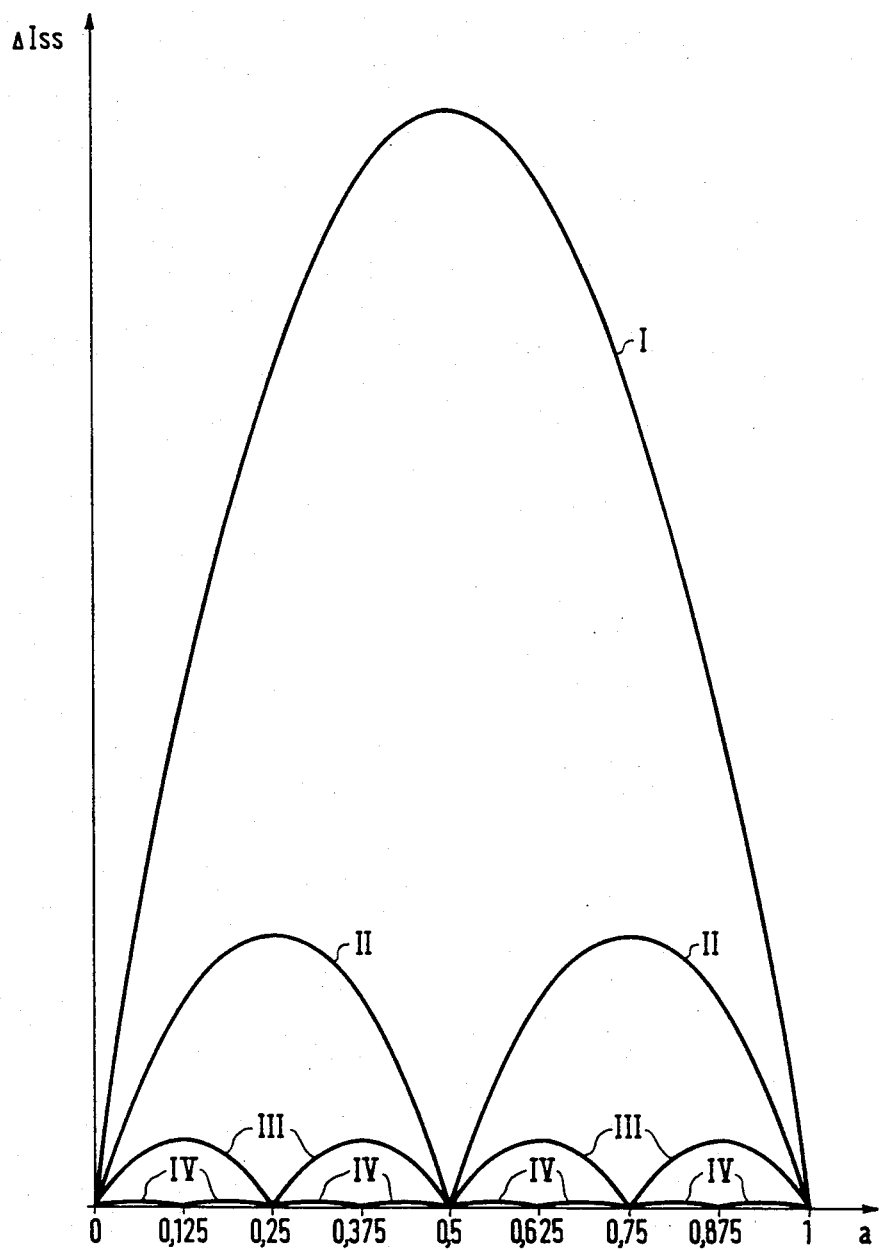
FIG. 6 shows a ripple current ratio versus duty cycle plot for different load current conditions.

The relationship between the ripple current ratio $\Delta I_{ss}$ and the "a" at different types of regulators is shown in FIG. 6.

Curve I is for regulators without a buck-boost autotransformer;

Curve II is for a switching device with a buck-boost autotransformer (FIG. 2);

Curve III is for an arrangement with two regulators (three buck-boost autotransformers) as in FIG. 1; and Curve IV is for an arrangement with four regulators (seven buck-boost autotransformers) as in FIG. 5.

For the invention one obtains:

$$\Delta I_{ss}/\Delta I_{ssn} = 4n$$

where
- $\Delta I_{ss}$ means Ripple current ratio of the current in a regulator;
- $\Delta I_{ssn}$ means Ripple current ratio of the current with n regulators /n=number of regulators immediately connected to the battery.

Thereby the number of the minima is:

$$m = 2n + 1$$

For the switching device in FIG. 5, one obtains minima occurring at 0, 0.125, 0.25, 0.375, 0.5, 0.625, 0.75, 0.875 and 1.

In the case of a drive for an electrical vehicle with a power of 40 KW and with a switching device as described in Fig. 2, the inductive circuit buck-boost autotransformer with conducting band-wound core has, for example, an inductance on the order of a few micro henries.

It will now be understood that there has been disclosed an improved control system for a direct current regulator that is smaller, lighter and has reduced losses.

As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured as Letters Patent of the United States is:

1. A control device for a switching arrangement with a direct current source feeding a load through a semiconductor rectifier regulator unit having two controllable semiconductor rectifier elements of identical conductance direction as part of the regulator unit; a device for generating clock signals as part of the control device connected to the controllable semiconductor rectifier elements; an inductive impedance connected to an output of each semiconductor rectifier element to provide an output terminal connection to the load; an input connection to each semiconductor rectifier element connected with a positive terminal of the direct current source; wherein each output connection of the semiconductor rectifier elements are connected by the inductive impedance to the load and each is also connected by a discharge diode to the negative terminal of the direct current power supply; the control device providing two clock frequency signals electrically offset by 180 degrees to the two controllable semiconductor rectifier elements through regulators such that said semiconductor elements are conducting and non-conducting 180 degrees offset from each other and this control device characterized by having:
- a direct current motor as the load;
- a dual winding, buck-boost, autotransformer with a center tap between the dual windings as the inductive impedances;
- a reference value generator providing control of a duty cycle of the clock frequency signals connected within the control device;
- an additional semiconductor rectifier regulator unit and an additional buck-boost autotransformer in parallel with and identical to the first semiconductor rectifier regulator unit with the center tap point of the first buck-boost autotransformer and a center tap point of the additional buck-boost autotransformer connected to opposite ends of a third buck-boost autotransformer; and
- a center tap point of the third buck-boost autotransformer connected to a power input terminal of the load;

wherein the control device generates identical duty cycle clock frequency signals for the four semiconductor rectifier elements; and the clock frequency signals generated for the two parallel semiconductor rectifier regulators are electrically offset by 90 degrees from each other.

2. A control device according to claim 1, wherein the load is a d.c. motor and the motor's RPM level is controlled by driving the semiconductor rectifier elements by a duty cycle equal to one out of the following: 0.25, 0.5, 0.75 and 1.0.

3. A control device according to claim 2, wherein the d.c. motor has an exciter winding connected to an exciter current regulator to control the RPM level of the motor between control steps; and the duty cycle "a", of the exciter current regulator is controlled by the control device.

4. A control device according to claim 1, further characterized by having:
- at least one additional parallel switch device having two semiconductor rectifier regulators and at least one buck-boost autotransformer connected in parallel with the two semiconductor regulators and their two respective buck-boost autotransformers; and
- an additional buck-boost autotransformer connected to a center tap of the additional parallel switch device; and
- a final buck-boost autotransformer having as inputs of the first parallel switch device center tap point output and the additional parallel switch device center tap point output; and
- a center tap of the final buck-boost autotransformer connected to the input terminal of the load.

5. The control device according to claim 1, further characterized by having a switching contactor connected to switch the load to the operating regulator if the other regulator fails to operate.

6. The control device according to claim 2, further characterized by having a switching contactor connected to switch the load to the operating regulator if the other regulator fails to operate.

7. The control device according to claim 3, further characterized by having a switching contactor connected to switch the load to the operating regulator if the other regulator fails to operate.

8. A control device according to claim 1, further characterized by having a computerized regulation device calculating, using a proportional actual RPM level of the d.c. motor, the duty cycle having minimum ripple current for the RPM level specified by the reference value generator, an appropriate exciter current, and corresponding control signals for the inductive load semiconductor regulators and the exciter current semiconductor regulators to provide the desired RPM level.

9. A control device according to claim 2, further characterized by having a computerized regulation device calculating, using a proportional actual RPM level of the d.c. motor, the duty cycle having minimum ripple current for the RPM level specified by the reference value generator, an appropriate exciter current, and corresponding control signals for the inductive load semiconductor regulators and the exciter current semiconductor regulators to provide the desired RPM level.

10. A control device according to claim 3, further characterized by having a computerized regulation device calculating, using a proportional actual RPM level of the d.c. motor, the duty cycle having minimum ripple current for the RPM level specified by the reference value generator, an appropriate exciter current, and corresponding control signals for the inductive load semiconductor regulators and the exciter current semiconductor regulators to provide the desired RPM level.

11. A control device according to claim 4, further characterized by having a computerized regulation device calculating, using a proportional actual RPM level of the d.c. motor, the duty cycle having minimum ripple current for the RPM level specified by the reference value generator, an appropriate exciter current, and corresponding control signals for the inductive load semiconductor regulators and the exciter current semiconductor regulators to provide the desired RPM level.

* * * * *